United States Patent
Hammes (10) Patent No.: US 12,469,174 B2
(45) Date of Patent: Nov. 11, 2025

(54) CONFIGURATION OF A 3D SENSOR FOR SAFE OBJECT TRACKING

(71) Applicant: SICK AG, Waldkirch (DE)

(72) Inventor: Markus Hammes, Waldkirch (DE)

(73) Assignee: SICK AG, Waldkirch (DE)

(*) Notice: Subject to any disclaimer, the term of this patent is extended or adjusted under 35 U.S.C. 154(b) by 93 days.

(21) Appl. No.: 18/407,849

(22) Filed: Jan. 9, 2024

(65) Prior Publication Data
US 2024/0233186 A1 Jul. 11, 2024

(30) Foreign Application Priority Data
Jan. 10, 2023 (EP) ................................. 23150892

(51) Int. Cl.
| | |
|---|---|
| G06T 7/80 | (2017.01) |
| G06T 7/20 | (2017.01) |
| G06T 7/70 | (2017.01) |
| G06V 10/22 | (2022.01) |
| H04N 13/246 | (2018.01) |

(52) U.S. Cl.
CPC .............. *G06T 7/85* (2017.01); *G06T 7/20* (2013.01); *G06T 7/70* (2017.01); *G06V 10/22* (2022.01); *H04N 13/246* (2018.05); *G06T 2200/04* (2013.01); *G06T 2207/10021* (2013.01); *G06T 2207/20092* (2013.01); *G06T 2207/30244* (2013.01)

(58) Field of Classification Search
CPC ..................................... G06T 7/85; G06T 7/70
USPC ............................................................. 348/46
See application file for complete search history.

(56) References Cited

U.S. PATENT DOCUMENTS

| | | | |
|---|---|---|---|
| 2009/0015663 A1* | 1/2009 | Doettling | F16P 3/00 348/46 |
| 2015/0269427 A1 | 9/2015 | Kim et al. | |
| 2019/0138818 A1 | 5/2019 | Gottumukkal et al. | |
| 2019/0158813 A1* | 5/2019 | Rowell | H04N 13/111 |
| 2020/0056742 A1* | 2/2020 | Böhning | G01V 8/20 |

FOREIGN PATENT DOCUMENTS

| | | |
|---|---|---|
| DE | 102006048166 A1 | 2/2008 |
| DE | 102005063217 B4 | 5/2014 |
| EP | 3203263 B1 | 4/2018 |

(Continued)

OTHER PUBLICATIONS

Rougier, et al. "Fall Detection from Depth Map Video Sequences"; Department of Computer Science and Operations Research (DIRO), University of Montreal, QC, Canada Research Center of the Geriatric Institute, University of Montreal, QC, Canada Jun. 20, 2011.

*Primary Examiner* — Amir Shahnami
(74) *Attorney, Agent, or Firm* — Nath, Goldberg & Meyer; Jerald L. Meyer; Morgan D. Rosenberg (57) ABSTRACT

A method for the automatic configuration of a 3D sensor for safe object tracking in which at least one 3D image is recorded by the 3D sensor, a detection region in which safety related objects can move is fixed within a detection zone of the 3D sensor using the at least one 3D image, and the object tracking is restricted to the detection region. In this respect, picture elements corresponding to a reference area, in particular a floor level, are identified in the at least one 3D image and the detection region is fixed with respect to these picture elements.

16 Claims, 4 Drawing Sheets

(56) References Cited

FOREIGN PATENT DOCUMENTS

| EP | 2825812 | B1 | 9/2018 |
| EP | 3611422 | A1 | 2/2020 |
| EP | 3521860 | B1 | 12/2020 |

* cited by examiner

CONFIGURATION OF A 3D SENSOR FOR SAFE OBJECT TRACKING

The invention relates to a method for the automatic configuration of a 3D sensor, in particular of a 3D camera, for safe object tracking and to a 3D sensor system respectively.

A 3D camera measures a distance and thereby acquires depth information. The detected three-dimensional image data having spacing values or distance values for the individual pixels are also called a 3D image, a distance image, or a depth map. Different methods are known for determining the depth information. A time of flight (TOF) camera, for example, illuminates a scene with amplitude modulated light. The light returning from the scene is received and is demodulated at the same frequency that is also used for the modulation of the transmitted light (lock-in process). After a repeat measurement with different relative phasing between the signals for the modulation at the transmission side and the demodulation at the reception side, the absolute phase displacement due to the runtime between the transmitted signal and the received signal can be determined that is in turn proportional to the object distance in the scene. Other 3D cameras use the principle of stereoscopy, a light section process or a projection process, or are configured as plenoptic cameras.

A particular application of a 3D camera is safety technology for the avoidance of accidents above all in an industrial environment. In this respect, persons in the environment of a hazard site, for example of a machine or especially of a robot are monitored. On recognition of a hazard situation, a safety related response takes place to avoid an accident. Sensors used in safety technology have to work particularly reliably and must therefore satisfy high safety demands, for example the EN13849 standard for safety of machinery and the machinery standard IEC61496 or EN61496 for electrosensitive protective equipment (ESPE). To satisfy these safety standards, a series of measures have to be taken such as a secure electronic evaluation by redundant, diverse electronics, functional monitoring or specifically monitoring of the contamination of optical components. The safety standards furthermore specify so-called safety levels or safety demand levels by which the achievable safety is classified. Examples for this are SIL in accordance with IEC61508/IEC61511 (safety integrity level) with 1 as the lowest and 4 as the highest level or PL (performance level) according to EN ISO 13849-1 with a "low" to e "high".

The most widespread safeguarding is based on protected fields that are configured by hand and that may not be infringed. The recognition of a safety distance that has been fallen below in dependence on the movement speed (speed and separation) is substantially more flexible. However, new safety functions are required for this that go beyond simple functions such as protected field evaluations. They include object tracking by which the respective current position and also the movement history of the detected objects become known.

Such expanded safety functions already present special challenges in the putting into operation and the configuration. It would thus admittedly generally be conceivable to assemble a detection region from 3D bodies for object tracking in a kind of CAD program analogously to a conventional protected field configuration. However, this becomes extremely complex and frequently asks too much of the users and it is time consuming and susceptible to error in every case. However, in the area of safety engineering errors are particularly critical because a hazard source is possibly not sufficiently safeguarded and accidents may occur.

DE 10 2006 048 166 A1 discloses a method of observing a person in an industrial environment. In this respect, a 3D model of the person is prepared based on 3D point data that are recorded by a stereo camera, for example. With knowledge of the position and the movement behavior of a machine and of the virtual body model, a hazard potential is determined and a safeguarding effect acts on the machine if required. However, a configuration of the stereo camera is not explained.

In EP 2 825 812 B1 a method and a device are described for safeguarding a hazardous work zone of a machine that works in an automated manner. In this respect, a mixed form of protected field monitoring and object tracking is used. The furthermore requires the conventional manual configuration of protected fields.

A method of configuring a monitoring device for monitoring a spatial zone is known from DE 10 2005 063 217 B4. In this respect, the floor is recognized with reference to so-called setup markers that have to be especially attached in the scene. The safeguarding takes place by means of protected fields that are then defined by hand with respect to the floor in a kind of CAD program as described above.

In EP 3 203 263 B1 a laser scanner projects its currently configured protected fields onto the floor. For this purpose, the specific orientation can be determined by a tilt sensor and the specific height can be determined by a detector so that a projection can be made in a suitable manner and without distortion from the perspective of the laser scanner. It remains the conventional protected field approach; no object tracking is provided. Even only with respect to protected fields, the visualization only facilitates its configuration, but does not change anything about the fact that the suitable protected field has to be set by hand.

EP 3 521 850 B1 describes a multilayer laser scanner on a vehicle that compares the respective detected contour with a floor model. The kind of sensor and the installation position serve for the obstacle detection in the direction of travel and are already not suitable for object tracking in principle.

Some image processing programs and in the meantime also smartphones eliminate moving objects from a recording in that a median filter is applied pixelwise over a series of images. A landmark apparently devoid of persons can thereby be photographed, for example. The intentional disregarding of persons is, however, exactly the opposite of what a technical safety monitoring should perform.

The known 3D configuration routines are thus complex and not accessible to automation. It is therefore the object of the invention to facilitate the configuration.

This object is satisfied by a method for the automatic configuration of a 3D sensor for safe object tracking and by a 3D sensor system in accordance with the respective independent claim. The 3D sensor can generally use any desired sensor principle. It is preferably a 3D camera as briefly explained in the introduction. It can be used for object tracking after the configuration by which the respective position of the moving objects is determined in a detection zone of the 3D sensor, which can in turn be used as a requirement of a more in-depth evaluation for a safeguarding of a machine or for accident avoidance. The object tracking is safe; this preferably also applies to the 3D sensor itself. Terms such as safe and safety in this description mean the satisfaction of demands of a safety standard for electrosensitive protective equipment or machine safety for accident avoidance. Examples of such standards have been named in the introduction, with equivalent other standards and equally regional variants or subsequent standards equally being covered. A safety standard in particular specifies safety levels with a clearly defined fault management.

The 3D sensor records at least one 3D image (distance image, spacing image, depth map) that encodes respective distances or spacings in an X-y grid of pixels. The specific representative is not important here. A detection region within the detection zone is fixed by the evaluation of the 3D image. The object tracking should only take place within the detection region because no movements of safety related objects are to be expected in other parts of the detection zone. The aim of the configuration is to locate this detection region in which the possible safety critical objects move such as persons, vehicles, machines, machine parts, and the like.

The invention starts from the basic idea of locating the detection region using a reference area on which objects move. This is the floor level or just the floor in most cases. Those picture elements are identified in the 3D image that correspond to the reference area. The detection region is then determined from these picture elements. This is not necessarily only the union of the picture elements; filters can be provided that expand the detection region, round it off, or reopen inaccessible zones of the reference area, for example.

The method runs automatically; it is a computer implemented process. At least one processing unit is provided in the 3D sensor for this purpose and/or is at least temporarily connected thereto for the configuration or also permanently for the further safety monitoring. Examples for an internal processing unit are digital processing modules such as a microprocessor or a CPU (central processing unit), an FPGA (field programmable gate array), a DSP (digital signal processor), an ASIC (application specific integrated circuit), an AI processor, an NPU (neural processing unit), a GPU (graphics processing unit), or the like. A connected processing unit can be a computer of any desired kind, including notebooks, smartphones, tablets, a (safety) controller, equally a local network, an edge device, or a cloud.

The invention has the advantage that the configuration is substantially simplified and unnecessary complexity is avoided, at least for the user. The configuration can thereby also be carried out by a user who does not have any in-depth knowledge of the specifically used sensor system. Not only the putting into operation is substantially shortened by the automation, the reduced complexity avoids errors from the start and thereby provides more safety.

The 3D location of the reference area is preferably determined by means of adapting a level that coincides as best as possible with the picture elements recorded in the at least one 3D image. The 3D location in space describes the orientation and position of the reference area, for example with respect to a camera coordinate system or a global coordinate system in which the camera position is known. Every picture element of the 3D image contains the distance or Z value measured at its X-Y position. It is therefore algorithmically possible to locate a reference area of best coincidence with the picture elements (level fit). Tolerances are permitted here; the picture elements will not be disposed exactly on a mathematical level in the real 3D image of a real scene. The largest possible reference area having the most picture elements matching it is preferably sought. The floor will descriptively comprise most picture elements that have a certain noise among one another, which is, however, the much more sensible result than a small, almost perfectly levelly measured area, for example, of a shelf.

The 3D sensor preferably measures its own orientation by means of a location sensor; an expected orientation of the reference area is derived from this and the expected orientation is used to identify picture elements corresponding to the reference area. This is an alternative or an addition to a purely algorithmic location of the reference area. An expectation of the orientation of the reference surface or of the floor can be derived from the 3D sensor's own orientation. This is in turn a strong starting point for an algorithm that identifies picture elements corresponding to the reference area, for example in that distance zones are formed with respect to the expected orientation in the correct perspective and picture elements matching them are counted. If the installation level of the 3D sensor is also calibrated or measured in advance, the picture elements can be directly classified as suitable or unsuitable.

An image sequence having a plurality of 3D images is preferably recorded while objects move through the detection zone. The configuration is then no longer based only on a 3D image, but on a time sequence of 3D images. More information is thereby available for an even more exactly adapted configuration.

Moving sections can in particular be distinguished from non-moving sections and it is avoided that the configuration is based on a 3D image that was recorded in an unfavorable constellation. Persons and other safety related objects can carry out typical movements, that are as representative as possible for the conceivable movements during the recording of the image sequence, to support the configuration.

Picture elements corresponding to the reference area are advantageously repeatedly identified using the 3D images from the image sequence to also detect temporarily covered parts of the reference area. Covered portions are resolved by observation of the detection zone over a certain time and a corresponding evaluation because the objects have moved on.

Picture elements are preferably determined in which the respectively measured distance changes by more than a nose tolerance over the 3D images of the image sequence and these picture elements are added to the detection region. A more than noise-induced change of the distance value means that an object has moved at the position of the respective picture element. Such change zones can form the detection region or a core detection region as a starting point for the fixing of the detection region or the previous detection region is correspondingly expanded. The most remote measured distance values are preferably used as the basis for the adapting of a reference area since shorter distances are due to moving objects. Change zones do not necessarily belong to the reference area as the example of a person close to a wall shows. A part of this person is recorded above the floor, another part is recorded in front of the wall, however. Both are recognized as change zones.

A check is preferably made for adjacent picture elements of picture elements corresponding to the reference area as to whether the measured distance values are compatible with the distance from the reference area within a distance tolerance and an adjacent picture element to which this applies is added to the detection region. This is a kind of filling function for the detection region (region growing). The initially or previously determined detection region with picture elements corresponding to the reference area is expanded to include adjacent picture elements provided they have measured a similar distance within the framework of the distance tolerance. This condition can already at least partly overlap with the adaptation of a level or with the picture elements corresponding to the originally identified one of the reference area depending on the algorithm used for it. As a rule, a new condition that produces a different result will be set via the filling. The filling can moreover be iterated once or multiple times so that then neighbors of neighbors also occur in ever higher orders as long as the distance tolerance is satisfied. At least the distance tolerance accumulated in this way will differ from the original belonging condition of a picture element with respect to the reference area.

The distance tolerance is preferably selected as large enough that a step or an inclined ramp is still compatible with the reference area. A relatively generous distance tolerance is thus intentionally selected. The distance tolerance can be selected from the interval 5-50 cm, for example. This is also conceivable for the identification of the original reference area, but carries the risk that an apparent reference area results that no longer has practically anything in common with a floor level. A successive filling, in contrast, can be very effective, in particular to expand the once located reference area subsequently by slanted portions for which a stair or a ramp is named as representative here.

The configured detection region is preferably displayed and an acknowledgment is requested before the detection region is used for safe object tracking. The display preferably takes place as a 2D or 3D image, preferably as an image of the scene with a superposed characterization of the configured detection region. The user or safety expert has the final word by the acknowledgment as to whether the required safeguarding is performed by the detection region. Such a final release can be a demand of a safety standard, independently of the performance of an automated configuration process. Beyond the mere acknowledgment, functions for a subsequent correction or processing of the detection region can be provided to the user. This can also go so far that the automatic configuration is only a first step of the configuration that, however, already delivers very targeted raw data by which the user finally fixes the detection region.

Subsequently to the configuration of the detection region, further 3D objects are preferably cyclically recorded and objects therein are tracked to output the respective current position of moving objects in the detection region as a safety function. In other words, it follows the configuration of the actual operation in which the configured detection region is used to track objects in a safe manner therein. The respective current positions of all the safety related objects are thus always known in a safe manner. It is conceivable to use 3D images recorded during the operation for a further refinement of the configuration of the detection region. However, as explained in the prior paragraph, a release is possibly required before such an adaptation of the detection region is actually used for the further operation.

The positions of the objects are preferably evaluated, in particular while including the previous movement, to make a decision as to whether there is a risk of an accident. The safe object positions are not an end in themselves, but rather a basis for a hazard monitoring. An estimate can in particular be made therewith whether an object comes too close to a machine or to another hazard source. The movement history is likewise known from the object tracking and can be integrated in the hazard evaluation, in particular the direction of movement and/or the speed. If a risk of an accident is recognized, a safeguarding measure preferably takes place by which in particular a monitored machine is set into a safe state. Depending on the situation, the machine can be slowed down or fully stopped or an evasion movement can be initiated for this purpose.

The 3D sensor system in accordance with the invention comprises at least a 3D sensor and at least a control and evaluation unit in which one of the explained embodiments of the method is implemented for the automatic configuration of the 3D sensor for safe object tracking. The 3D sensor is in particular a 3D camera as presented in the introduction. A linked system of a plurality of 3D sensor is also conceivable. The possible embodiments of the control and evaluation unit correspond to the processing units explained above on which the automatic process can run. The 3D sensor system is preferably safe in the sense of a safety level of a relevant safety standard.

The control and evaluation unit is preferably furthermore configured to carry out safe object tracking subsequent to the configuration by evaluating cyclically recorded 3D images. Current positions and, if required, the other movement behavior of the safety related objects are thus provided in a safe manner for a technical safety monitoring.

The invention will be explained in more detail in the following also with respect to further features and advantages by way of example with reference to embodiments and to the enclosed drawing. The Figures of the drawing show in.

Figure 1:
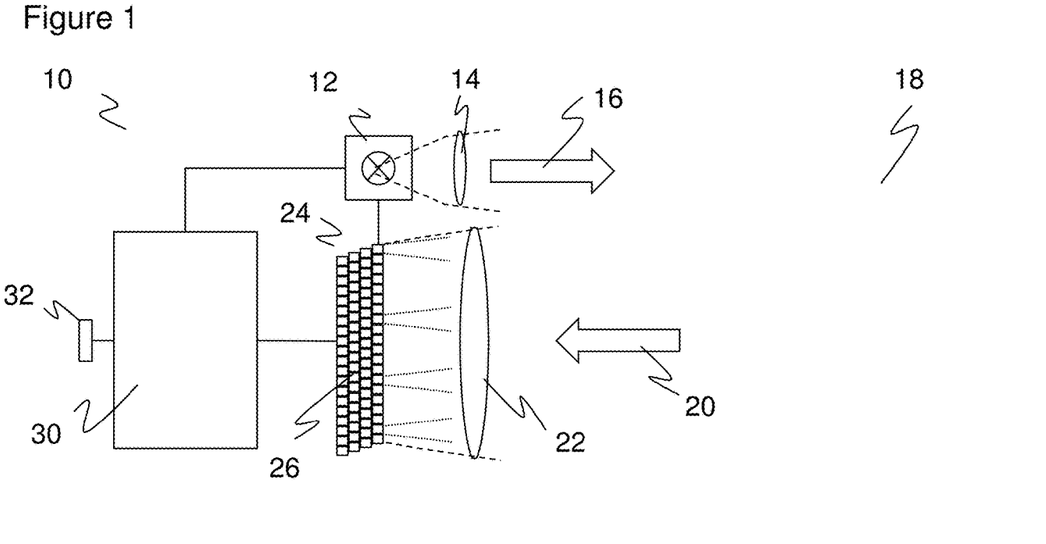
FIG. 1 a schematic block diagram of a time of flight camera as an example for a 3D sensor.

FIG. 1 shows a schematic block diagram of a time of flight camera as an example for a 3D sensor 10. An illumination unit 12 transmits modulated transmitted light 16 by a transmission optics into a detection zone 18. LEDs or lasers in the form of edge emitters or VSCELs can be considered as the light source. The illumination unit 12 is controllable such that the amplitude of the transmitted light 16 is modulated at a frequency in the range of 1 MHz to 1000 MHz The modulation is, for example, sinusoidal or rectangular, at least a periodic modulation.

When the transmitted light 16 is incident on an object in the detection region 18, a portion of the received light 20 is reflected back to the 3D sensor 10 and is guided there through a reception optics 22, for example a single lens or a reception objective, onto an image sensor 24. The image sensor 24 has a plurality of reception elements or reception pixels 26 arranged to form a matrix or a row, for example. The resolution of the image sensor 24 can extend from some few up to thousands or millions of reception pixels 26. The pixel arrangement is preferably a matrix so that a lateral spatial resolution results in an X direction and in a Y direction, which is supplemented by the Z direction of the distance measurement to form the three-dimensional image data. The reception pixels 26 are respectively configured for a demodulation corresponding to a lock-in process. The absolute phase offset is reconstructed on the bases of the time of flight through the detection region 18, that is converted into a distance value per reception pixel 26 by a plurality of measurements having different phases between the modulation frequency used for the transmitted light 16 and the modulation frequency used for the demodulation.

A control and evaluation unit 30 is connected to the image sensor 24 and to the illumination unit 12. The functionality for the modulation of the transmitted light 16 and for the demodulation of the received light 20 with a suitable time behavior for a time of flight measurement can be deployed as desired over the control and evaluation unit 30 and the illumination unit 12 or the image sensor 24 and its reception pixels 26. A 3D image, distance image, or depth image are generated as the result of the image recording. The 3D image is evaluated in the control and evaluation unit 30 itself or is output at an interface in an unprocessed or preprocessed form. The interface 32 or, alternatively, one or more further connectors, not shown, conversely serve for the input of control signals or parameterizations of the 3D sensor 10.

The time of flight camera explained with respect to FIG. 1 is only an example for a 3D sensor 10. Other 3D sensors are conceivable, in particular the variants of a 3D camera briefly named in the introduction, in principle also non-optical 3D sensors. A sensor assembly can be used instead of only one 3D sensor. At its core, the invention does not relate to the embodiment of the 3D sensor 10, but rather to its configuration for safe object tracking that will be subsequently explained with reference to FIGS. 2 to 7. The corresponding configuration process is implemented in any desired distribution in the control and evaluation unit 30 of the 3D sensor and/or in a processing unit connected thereto.

Figure 2:
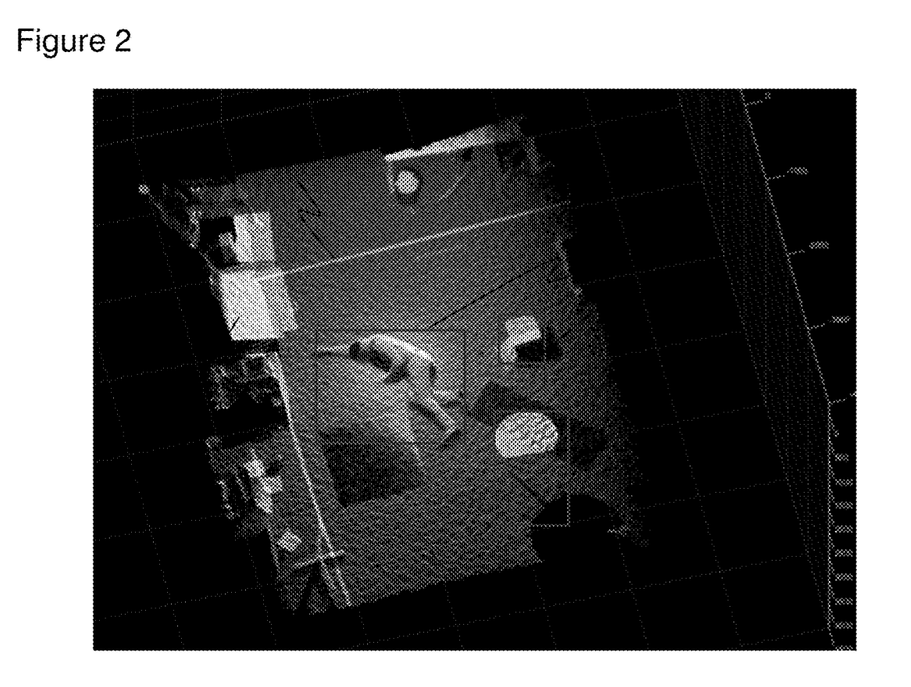
FIG. 2 an exemplary 3D image recorded by a 3D sensor with objects recognized therein.

FIG. 2 shows an exemplary 3D image recorded by a 3D sensor with objects recognized therein. The object recognition and thus also the object tracking are restricted to a detection region 34 within the total detection zone 18 and thus within a 3D image in which safety related objects 36 may be located. In particular static objects 38 at the margin are thus ignored. The location of the matching detection region 34 for a reliable safeguarding is the aim of the configuration now to be described.

Safe object tracking, i.e. object tracking as a safety function, can then be implemented on the basis of the configured detection region 34 in the subsequent operation. It is here a question of detecting moving objects 36 with sufficient reliability for safety applications and thus for accident avoidance for personal protection and to track the extent of their movements. A current position of the recognized objects 36 in the image is acquired with every detection cycle. The movement history is additionally known from which supplementary information such as the direction of movement and the speed result. In the case of safe object tracking integrated in the 3D sensor 10 positions and optionally supplementary information can be cyclically provided at the interface 32. The results of the object tracking can be used for autonomous route planning of vehicles and for the localization of objects and persons in a large operating environment. The data are additionally diversely redundant with respect to the localizing data of a radio localization system and can be used for their verification The moving objects 36 that are at least potentially (safety) relevant are detected with respect to a reference area 40, preferably the floor. For example, the scene detected in the 3D image is compared with a known reference zone in every detection cycle to recognize the relevant objects 36 with reference to the geometrical differences. It is necessary for this that where the reference area 40 together with its location and orientation is located in space is exactly fixed as part of the configuration. In addition, zones that are disposed outside and in which a detection is irrelevant are fixed by the detection region 34. This is shown by the static objects 38 at the margin in FIG. 2. Such irrelevant objects can, for example, be shelves, pallets, or crates with respect to which it is clear from the start that they cannot be considered as movement zones of relevant object 36. Corresponding zones can therefore be masked or classified as stationary movement obstacles. This reduces the effort and possible incorrect detections.

Figure 3:
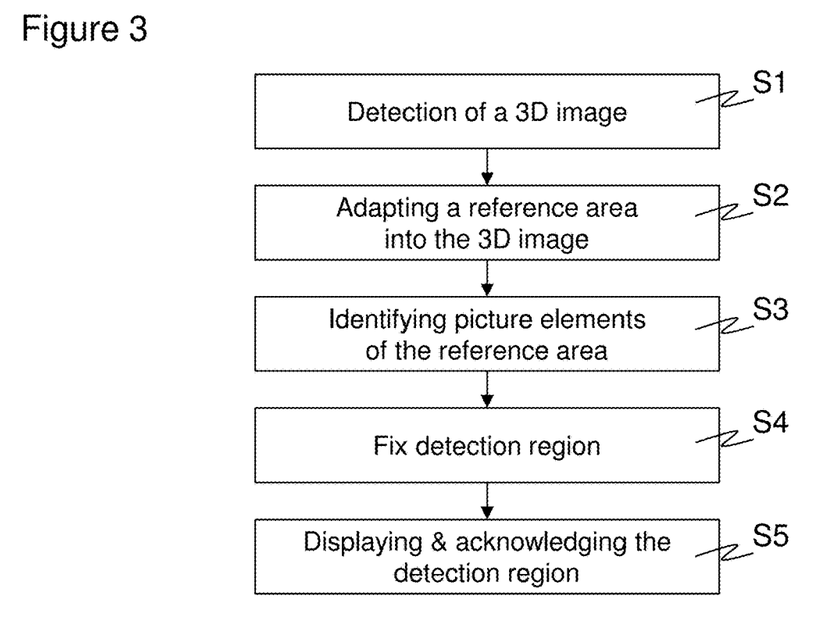
FIG. 3 an exemplary flowchart for the configuration of a detection region for object tracking with a 3D sensor.

FIG. 3 shows an exemplary flowchart for the configuration of the detection region 34. After the mechanical attachment and the electrical connection of the 3D sensor 10, the safe object tracking function is configured in an automatically running process.

In a step S1, one or more 3D images of the scene are recorded by the 3D sensor 10 in the detection zone 18. A plurality of 3D images can be used for a repetition of a single image evaluation. However, an evaluation of a plurality of 3D images preferably takes place in an overarching manner to, for example, compensate for partial zones hidden in individual 3D images by other 3D images.

In a step S2, a reference areas 40 is adapted into the at least one 3D image. Different 3D algorithms are known per se for this that, for example, minimize a degree of error of the storage positions remaining with respect to the reference area 40 in an optimization process including all the picture elements or only some of the picture elements by rotating, displacing, and changing the shape and size of the reference area 40. The adapting preferably takes place under the assumption that the reference area 40 is the largest area or level that is compatible with the picture elements of the 3D image in the sense of small remaining storage stations or of anther error measure.

In a step S3, those picture elements are identified that have recorded the reference area 40. The criterion for this is that the distance measured from the picture element is that of the reference area 40 at least except for a noise tolerance. The two steps S2 and S3 are above all distinctly separated for reasons of the explanation. Depending on the algorithm, the adapting of the reference surface 40 and the location of the picture elements corresponding to the reference area 40 take place simultaneously at least in part.

In a step S4, the detection region 34 is fixed with reference to the picture elements of the reference area 40 identified in step S3. In the simplest case, this can simply be the union of these picture elements. An additional processing preferably takes place to expand, round off, or also to reduce the detection region 34 in size, for example to adapt measurement overshoots to their neighborhood, to provide the detection region 34 with a regular shape, or to exclude irrelevant objects 38.

In a step S5, the configured detection region 34 is finally shown so that the user confirms its correctness. A further safety level is thus included and the final responsibility for the safety remains with the user or safety expert such as many safety standards require. The display preferably takes place as a 2D image or as a 3D image of the scene with a superposed representation of the detection region 34. The user can be provided with the possibility at this time of changing the detection region 34 before the release. Tools are provided for this purpose, for example, analogous to a drawing program or a CAD program.

The routine in accordance with FIG. 3 is a simple possibility of the automatic configuration of the detection region 34 with a distinction down to the pixel of the reference area 40 from irrelevant zones that can be masked. Different alternatives, modifications, and extensions will be explained in the following.

Figure 4:
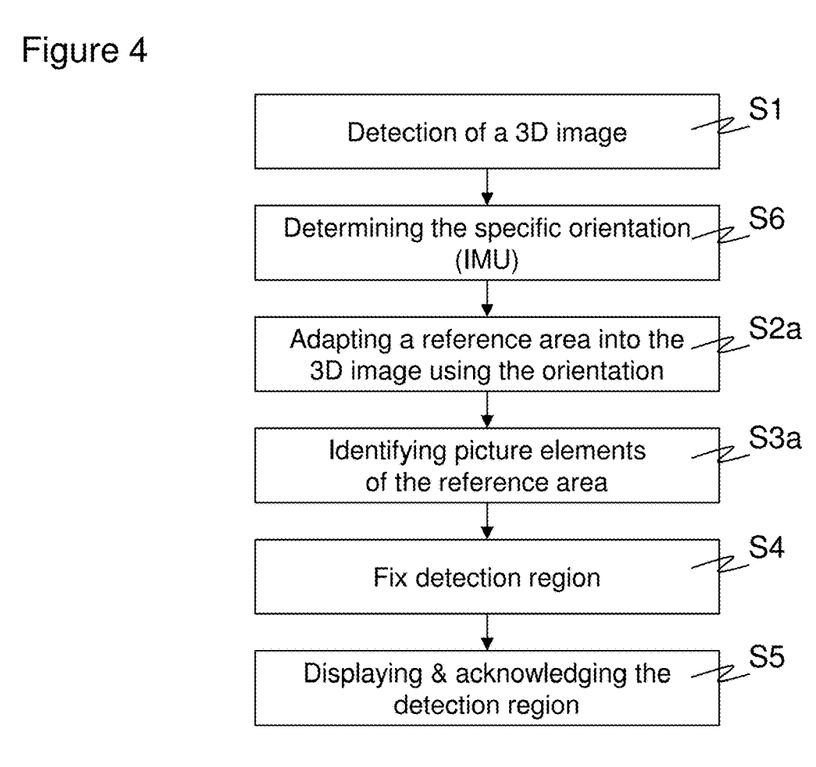
FIG. 4 an exemplary alternative flowchart with use of a location sensor.

FIG. 4 shows an exemplary alternative flowchart using a location sensor. The location sensor (for example an IMU, inertial measurement unit) is preferably integrated in the 3D sensor 10 and determines its orientation in space, in particular relative to the field of gravity of the earth. The routine shown in FIG. 4 corresponds in principle to that of FIG. 3 so that only the differences will be explained.

Subsequent to the detection of a 3D image in step S1 or prior thereto or in parallel therewith, the specific orientation of the 3D sensor 10 is determined by the location sensor. If the installation position of the 3D sensor 10 does not change, a single or infrequent determination of the orientation is sufficient while, for example, a current determination of the orientation should take place for mobile applications of the 3D sensor 10. On condition that the reference area 40 is aligned perpendicular to the field of gravity of the earth, as in the case of the floor, or that, alternatively, a deviation has become known, the orientation of the reference area 40 relative to the 3D sensor and thus in the respective 3D image can thus be predicted from the specific orientation of the reference area 40.

Steps S2 and S3 are accordingly modified in accordance with FIG. 3. In a modified step S2a, the adapting of the reference area 40 now takes place with knowledge of the orientation of the reference area 40 determined by the location sensor. This substantially restricts the search area of an optimization process by which the reference area 40 is adapted. The picture elements corresponding to the reference area 40 are correspondingly identified with less effort and as a rule also more precisely in a modified step S3a.

It is conceivable to additionally algorithmically determine the orientation of the reference area 40 as explained with reference to step S2 of FIG. 3. FIGS. 3 and 4 thus, on the one hand, represent alternatives, but also a combination possibility. In combination, the reliability of the configuration is further increased by redundant determination or by plausibilization options, which is particularly very valuable in a technical safety application.

The option has already been briefly looked at of detecting and evaluating a plurality of 3D images or an image sequence. On the one hand, this makes possible an exact taking of the mean for measurement errors with a static scene.

However, the configuration routine is preferably thereby expanded by an additional movement phase. In this phase, the user is recommended to move the persons and movable objects into the accessible zones in an exemplary manner. For example, persons should walk through the zone or vehicles should cross the detection zone 18 along their programmed route. A continuous image series is then recorded during the movement phase and picture elements that are compatible with the reference area 40 are looked for in the whole image series. It is ensured by the movement that all the pixels belonging to the movement zone are free at some point and are identified as corresponding to the reference area 40. Dead zones are thereby avoided in which persons or moving objects temporarily cover a part of the reference area 40 and that were therefore erroneously excluded, or a movement phase was excluded, from the detection region 34. The distances measured with very different amounts due to the movement can furthermore serve as an important indicator for the belonging to the detection region 34. Supplementary to a dedicated movement phase, it is also possible to continue the configuration in parallel with the actual operation and to collect data for a further optimization of the configuration.

Figure 5:
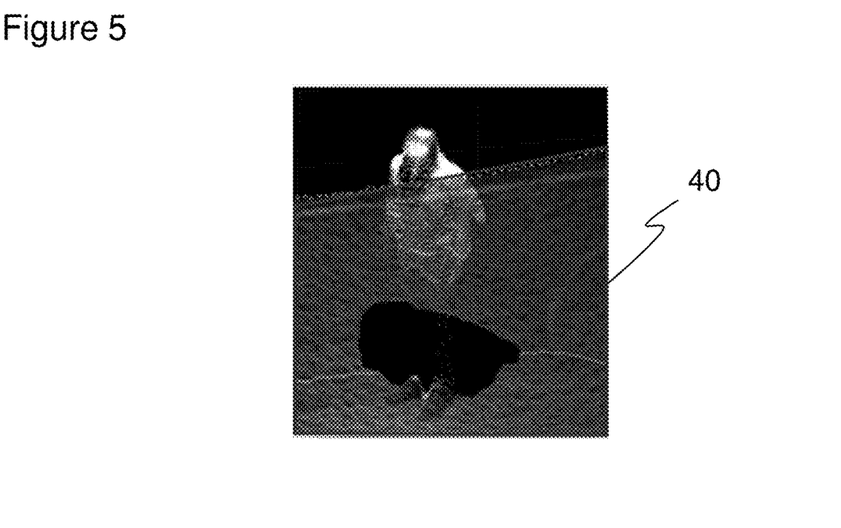
FIG. 5 an exemplary image to explain image zones in which a movement of a safety related object takes place outside a reference area.

FIG. 5 illustrates a special situation with a relevant object 36 at the margin of the reference area 40, for example close to a wall. The head area of the person is detected outside the reference area 40. It may be sensible in this case to expand the detection region 34 beyond the reference area 40 and to add picture elements that detect the head area or the wall behind it. Such picture elements are recognized, for example, by the distance values measured during a movement phase of the configuration by one and the same picture element significantly changing, for example by more than a noise tolerance. This idea should now be looked at in a little more depth since further advantages can be achieved with it.

Figure 6:
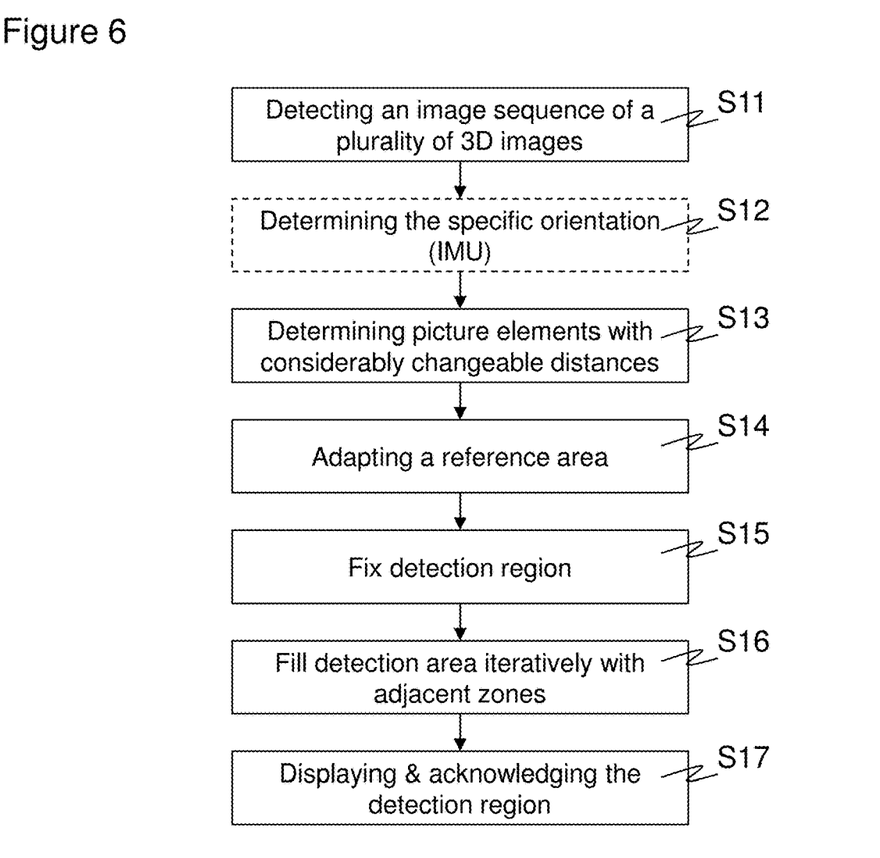
FIG. 6 an exemplary flowchart in a further alternative with a determination of changes of measured distances.

FIG. 6 shows an exemplary flowchart of the configuration with a determination of changes of measured distances. In a step S11, an image sequence with a plurality of 3D images is recorded corresponding to the previous step S1, preferably during a movement phase in which relevant objects 36 move in the detection zone 18. In a step S12, the specific orientation of the 3D sensor 10, and thus the orientation of the reference surface 40, can be determined by means of a location sensor optionally and analogously to step S6 of FIG. 4.

In a step S13, change zones are determined the detection zone 18. They are picture elements or groups of picture elements in which the measured distance value changes greatly over the image sequence. The criterion for this can be the exceeding of a noise tolerance.

In a step S14, a reference area 40 is adapted analogously to the step S2 or S2a. Its orientation is known provided that the optional step S12 had previously been carried out. The distance of the reference area 40 can be determined with reference to the change zones determined by step S13. The change zones can previously be evaluated per se due to the special situation explained with reference to FIG. 5 to distinguish between picture elements in change zones that correspond to the reference area 40 and that indicate the distance of the reference area 40 and those that do not do this, for example due to a marginal location at a wall. Prior knowledge of the orientation and/or distance of the reference area is thus available for the adapting of the reference area 40, with the reference area 40 again, alternatively or additionally, being able to be adapted without prior knowledge as in step S2. A further alternative comprises no longer directly adapting a reference area 40 at all, but rather deriving the reference area 40 directly from the change zones.

In a step S15, a provisional detection region 34 is fixed corresponding to the step S4 of FIGS. 3 and 4 using the change zones and/or the reference area 40. In this respect, the picture elements corresponding to the reference area 40 can be previously located analogously to steps S3, S3a.

In an optional step S16, the provisional detection region 34 can be filled to determine the total accessible zone so that the result of step S15 was only called a provisional detection region 34. In this respect, starting from the previously determined detection region 34 and thus from already known zones of the reference area 40 in the adjacent neighborhood of picture elements, a check is made whether an adjacent picture element likewise belongs to the reference area 40 and is added to the detection region 34 in this case. The criterion here is preferably that the distance value measured in an adjacent picture element differs by more than a distance tolerance from its adjacent picture element already belonging to the detection region 34. This neighborhood check can be iteratively repeated until all the accessible zones have been detected in the grown detection region 34.

Detection regions that are not in a level can also be automatically configured by a somewhat larger distance tolerance. If, for example, there are stairs in the detection zone 18, the individual steps are determined as a change zone during the movement phase in step S13 and are added to the detection region 34 later in step S16. A slanted ramp can be added in a similar manner. Generally, a similar result can be achieved by adapting a reference area 40 that may have a certain inclination or curvature. In this respect, however, unlike an iterative filling, difficulties arise in suitably parameterizing the optimization algorithm so that only suitable reference areas 40 are located in future.

In a step S17 terminating the configuration, the configured detection region is displayed, analogously to step S5, optionally post-processed and released.

FIG. 7 again shows an exemplary 3D image recorded by a 3D sensor 10 with safety related moved objects 36 and irrelevant static objects 38. The static objects 38 can have the result that certain parts 42 of the floor and thus of the reference area 40 are actually not accessible at all. They should nevertheless preferably be excluded from the detection region 34. This is only conceivable retroactively with a higher algorithmic effort that tests possible routes within the detection region 34. Such inaccessible parts 42 are not added to the detection region 34 at all in the first place due to the iterative filling in step S16 starting from change zones.

Figure 7:
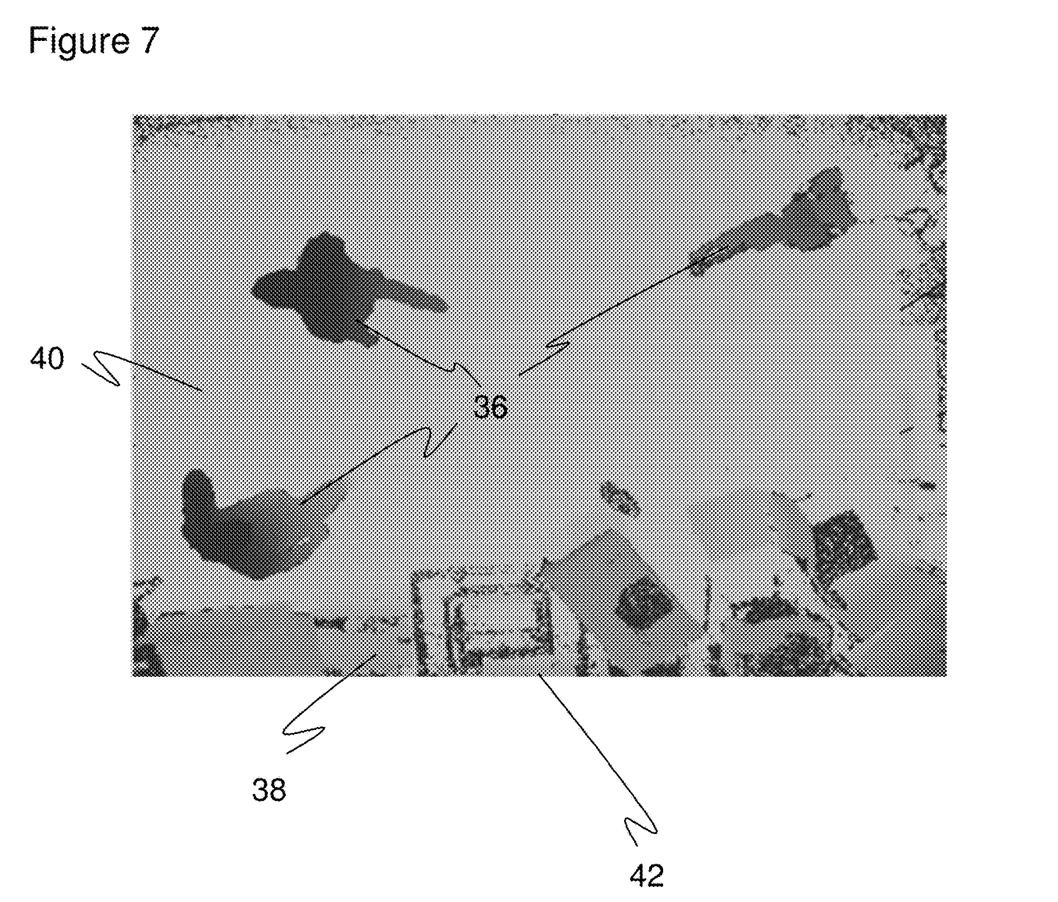
FIG. 7 an exemplary 3D image recorded by a 3D sensor with safety related moving objects and irrelevant static objects.

Although FIGS. 3, 4, and 7 each separately show an exemplary routine, a large number of mixed forms are conceivable that take over individual or several steps from one routine into the other routine in a replacing or accumulative manner. This in particular applies to the use of 3D image sequences instead of individual 3D images, the use of a location sensor for determining the orientation of the reference area 40, the adapting of the reference area 40 with and without prior knowledge of its orientation and/or distance, the location of change zones as the starting point for picture elements of the detection region 34, or the filling of the detection region 34 using neighborhood comparisons.

The invention claimed is:

1. A method for the automatic configuration of a 3D sensor for safe object tracking, comprising:
    recording at least one 3D image with the 3D sensor; and
    fixing a detection region in which safety related objects can move using the at least one 3D image, the detection region being within a detection zone of the 3D sensor, and wherein the safe object tracking is restricted to the detection region;
    wherein picture elements corresponding to a reference area are identified in the at least one 3D image and the detection region is fixed with respect to the picture elements corresponding to the reference area,
    wherein the at least one 3D image comprises an image sequence having a plurality of 3D images which are recorded while the safety related objects move through the detection zone, and
    wherein the picture elements corresponding to the reference area are repeatedly identified using the 3D images from the image sequence to also detect temporarily covered parts of the reference area.

2. The method in accordance with claim 1,
    wherein the picture elements correspond to a floor level.

3. The method in accordance with claim 1,
    wherein a 3D location of the reference area is determined by means of adapting a level that coincides as best as possible with the picture elements recorded in the at least one 3D image.

4. The method in accordance with claim 1,
    wherein the 3D sensor measures its own orientation by means of a location sensor, wherein an expected orientation of the reference area is derived from the measured orientation, and the expected orientation is used to identify the picture elements corresponding to the reference area.

5. The method in accordance with claim 1,
    wherein picture elements are determined in which a respectively measured distance changes by more than a noise tolerance over the 3D images of the image sequence, and wherein these picture elements are added to the detection region.

6. The method in accordance with claim 1,
    wherein a check is made for adjacent picture elements of the picture elements corresponding to the reference area as to whether measured distance values are compatible with a distance from the reference area and an adjacent picture element to which this applies is added to the detection region.

7. The method in accordance with claim 6,
    wherein a distance tolerance is selected as large enough that a step or an inclined ramp is still compatible with the reference area.

8. The method in accordance with claim 1,
    wherein the configured detection region is displayed and an acknowledgment is requested before the detection region is used for the safe object tracking.

9. The method in accordance with claim 1,
    wherein subsequent to the configuration of the detection region, further 3D images are cyclically recorded and objects therein are tracked to output a respective current position of moving objects in the detection region as a safety function.

10. The method in accordance with claim 9,
    wherein the positions of the objects are evaluated to decide whether there is a risk of accident.

11. The method in accordance with claim 10,
    wherein the positions of the objects are evaluated while including the previous movement to decide whether there is a risk of accident.

12. The method in accordance with claim 10,
    wherein the positions of the objects are evaluated to set a monitored machine into a safe state.

13. The method in accordance with claim 10,
    wherein the positions of the objects are evaluated to set a monitored machine into a safe state if a decision is made that there is a risk of accident.

14. A 3D sensor system, comprising:
    a 3D sensor; and
    a control and evaluation unit configured for safe object tracking, the control and evaluation unit being further configured to:
    record at least one 3D image with the 3D sensor; and
    fix a detection region in which safety related objects can move using the at least one 3D image, the detection region being within a detection zone of the 3D sensor, and wherein the safe object tracking is restricted to the detection region,
    wherein picture elements corresponding to a reference area are identified in the at least one 3D image and the detection region is fixed with respect to the picture elements corresponding to the reference area,
    wherein the at least one 3D image comprises an image sequence having a plurality of 3D images which are recorded while the safety related objects move through the detection zone, and wherein the picture elements corresponding to the reference area are repeatedly identified using the 3D images from the image sequence to also detect temporarily covered parts of the reference area.

15. The 3D sensor in accordance with claim 14, wherein the control and evaluation is further configured to carry out the safe object tracking subsequent to the configuration by evaluating cyclically recorded 3D images.

16. A method for the automatic configuration of a 3D sensor for safe object tracking, comprising:
   recording at least one 3D image with the 3D sensor; and
   fixing a detection region in which safety related objects can move using the at least one 3D image, the detection region being within a detection zone of the 3D sensor, and wherein the safe object tracking is restricted to the detection region;
   wherein picture elements corresponding to a reference area are identified in the at least one 3D image and the detection region is fixed with respect to the picture elements corresponding to the reference area,
   wherein the at least one 3D image comprises an image sequence having a plurality of 3D images which are recorded while the safety related objects move through the detection zone, and
   wherein picture elements are determined in which a respectively measured distance changes by more than a noise tolerance over the 3D images of the image sequence, and wherein these picture elements are added to the detection region.

* * * * *